(12) United States Patent
Tanaka et al.

(10) Patent No.: US 7,668,765 B2
(45) Date of Patent: Feb. 23, 2010

(54) METHOD AND APPARATUS FOR LOCATION-SENSITIVE, SUBSIDIZED CELL PHONE BILLING

(75) Inventors: Hirohisa A. Tanaka, Menlo Park, CA (US); Geoffrey R. Hendrey, San Francisco, CA (US); Philip J. Koopman, Jr., Pittsburgh, PA (US)

(73) Assignee: deCarta Inc., San Jose, CA (US)

( * ) Notice: Subject to any disclaimer, the term of this patent is extended or adjusted under 35 U.S.C. 154(b) by 1011 days.

(21) Appl. No.: 09/898,497

(22) Filed: Jul. 5, 2001

(65) Prior Publication Data

US 2002/0123934 A1 Sep. 5, 2002

Related U.S. Application Data

(60) Provisional application No. 60/216,728, filed on Jul. 7, 2000.

(51) Int. Cl.
*G07F 19/00* (2006.01)

(52) U.S. Cl. .................. 705/34; 455/406; 455/407; 455/408; 455/456.1

(58) Field of Classification Search .............. 705/32, 705/20, 14, 1; 340/825.49, 825.36; 455/406, 455/407, 408, 456
See application file for complete search history.

(56) References Cited

U.S. PATENT DOCUMENTS

| 5,043,736 | A | | 8/1991 | Darnell et al. | |
|---|---|---|---|---|---|
| 5,295,180 | A | * | 3/1994 | Vendetti et al. | 455/456 |
| 5,568,153 | A | | 10/1996 | Béliveau | |
| 5,758,288 | A | * | 5/1998 | Dunn et al. | 455/456 |
| 5,761,648 | A | | 6/1998 | Golden et al. | |
| 5,774,802 | A | | 6/1998 | Tell et al. | |
| 5,852,775 | A | | 12/1998 | Hidary | |
| 5,873,040 | A | | 2/1999 | Dunn et al. | |
| 5,884,272 | A | | 3/1999 | Walker et al. | |

(Continued)

FOREIGN PATENT DOCUMENTS

WO    WO 97/13387    4/1997

(Continued)

OTHER PUBLICATIONS

Hadfield, Peter. You can run, but you can't hide. Aug. 21, 1999. New Scientist.*

(Continued)

*Primary Examiner*—F. Zeender
*Assistant Examiner*—M. Thein
(74) *Attorney, Agent, or Firm*—Fenwick & West LLP (57) ABSTRACT

A method and system for determining a billing rate of a telecommunications connection is disclosed. The method and system may be used in a location aware telecommunications system that can determine the location of a telecommunications unit (TU) being used within the system. The geographic location of a mobile unit (MU) is determined, and compared to a list a predetermined subsidized zones. When the MU initiates or receives a call from within a subsidized zone, and the MU is otherwise responsible for paying a predetermined billing rate associated with the call, the predetermined rate is subsidized for at least the portion of the call made while the MU is located within the subsidized zone.

33 Claims, 5 Drawing Sheets

U.S. PATENT DOCUMENTS

| | | | |
|---|---|---|---|
| 5,953,400 | A | 9/1999 | Rosenthal et al. |
| 5,963,864 | A | 10/1999 | O'Neil et al. |
| 5,974,393 | A | 10/1999 | McCullough et al. |
| 5,982,281 | A | 11/1999 | Layson, Jr. |
| 6,018,699 | A | 1/2000 | Baron, Sr. et al. |
| 6,044,261 | A | 3/2000 | Kazmi |
| 6,047,327 | A | 4/2000 | Tso et al. |
| 6,052,122 | A | 4/2000 | Sutcliffe et al. |
| 6,055,434 | A | 4/2000 | Seraj |
| 6,060,995 | A | 5/2000 | Wicks et al. |
| 6,061,561 | A | 5/2000 | Alanara et al. |
| 6,061,681 | A | 5/2000 | Collins |
| 6,067,045 | A | 5/2000 | Castelloe et al. |
| 6,067,356 | A | 5/2000 | Lautenschlager et al. |
| 6,073,138 | A | 6/2000 | de I'Etraz et al. |
| 6,157,841 | A * | 12/2000 | Bolduc et al. ............... 455/456 |
| 6,166,685 | A * | 12/2000 | Soliman ................. 342/357.1 |
| 6,181,927 | B1 * | 1/2001 | Welling et al. .............. 455/414 |
| 6,208,866 | B1 * | 3/2001 | Rouhollahzadeh et al. .. 455/456 |
| 6,400,956 | B1 * | 6/2002 | Richton ...................... 455/456 |
| 6,411,891 | B1 * | 6/2002 | Jones ........................ 701/201 |
| 6,484,148 | B1 * | 11/2002 | Boyd .......................... 705/14 |
| 6,671,506 | B1 * | 12/2003 | Lee ............................. 455/406 |
| 2002/0077130 | A1 * | 6/2002 | Owensby .................... 455/466 |

FOREIGN PATENT DOCUMENTS

| | | |
|---|---|---|
| WO | WO 98/36585 | 8/1998 |
| WO | WO 00/35216 | 6/2000 |
| WO | WO 00/51333 | 8/2000 |

OTHER PUBLICATIONS

"Cellphone-tower issue hangs over Christchurch", Robson, Seth, The Press, Apr. 11, 2000, pag. 9.*

PCT International Search Report, International Application No. PCT/US01/21336, Sep. 5, 2002, 4 pages.

* cited by examiner

| LOCID | BUSID | LAT | LONG | RADIUS | RATE | STIME | FTIME | SDATE | FDATE |
|---|---|---|---|---|---|---|---|---|---|
| 001 | JG12 | 39.980690 | -82.935252 | 10 | 0.02 | 13:00 | 15:00 | 2001-06-15 | 2002-06-14 |
| 002 | T054 | 39.082564 | -83.456584 | 20 | 0.01 | 14:30 | 17:30 | 2001-06-01 | 2004-01-01 |
| 003 | J359 | 35.084565 | -86.254526 | 25 | 0.01 | 11:00 | 13:30 | 2001-09-16 | 2002-09-15 |
| 004 | P254 | 34.584568 | -87.545985 | 10 | 0.05 | 17:30 | 20:30 | 2001-01-01 | 2005-01-01 |
| 005 | C006 | 46.565845 | -96.584565 | 15 | 0.05 | 07:00 | 08:00 | 2001-08-01 | 2005-07-31 |

FIG. 4

| CONNECTID | LOCID | CONNECTSTIME | CONNECTFTIME |
|---|---|---|---|
| 512565 | 002 | 2001-06-15 14:35:25 | 2001-06-15 14:45:55 |
| 512654 | 002 | 2001-06-16 14:55:01 | 2001-06-16 15:05:27 |
| 215885 | 003 | 2002-09-10 11:00:00 | 2002-09-10 13:26:00 |
| 568453 | 004 | 2001-09-12 17:55:57 | 2001-09-12 18:07:09 |
| 545698 | 003 | 2001-10-05 11:01:28 | 2001-10-05 12:22:26 |
| 456845 | 005 | 2001-08-05 07:22:24 | 2001-08-05 07:46:23 |
| 458848 | 004 | 2001-02-26 20:00:00 | 2001-02-26 20:28:23 |

METHOD AND APPARATUS FOR LOCATION-SENSITIVE, SUBSIDIZED CELL PHONE BILLING

This application relates to, and claims priority from, U.S. Provisional Application Ser. No. 60/216,728, filed Jul. 7, 2000, herein incorporated by reference.

FIELD OF THE INVENTION

The present invention relates to mobile telecommunication systems in general. More particularly, the invention relates to a method and system of billing mobile telecommunications users a selective amount based on the geographic location of the mobile unit during a call.

BACKGROUND OF THE INVENTION

Billing systems for mobile telecommunication units have traditionally been designed on the assumption that all calls were being made while mobile, and that standard land-line telephones would be used whenever possible to garner reduced phone rates. However, cell phone providers have now largely achieved high coverage, and are switching their attention away from building cell infrastructure to plugging coverage holes, increasing revenues from installed infrastructure, and increasing capacity at heavily used cells.

Billing systems in these mobile telecommunications systems presently do not provide an incentive for customers to place or receive calls from a specified geographic location. That is, billing within a telecommunications system is generally ubiquitous. A common billing system in a mobile telecommunications system might charge a mobile user a flat fee per minute of voice airtime. Another common billing system is to charge users a monthly fee, with which is included an allotment of minutes, beyond which the user must pay an additional fee per minute. Yet another common billing system is to allow multiple mobile users to share commonly owned minutes. For example, a husband and wife may each have their own mobile phone, but they share from a common monthly allotment of minutes, and only receive one bill from the mobile telecommunications provider.

As mobile telecommunications systems are becoming more advanced, a mobile unit's geographic location may be used to provide location-based services (LBS). That is, mobile telecommunications devices that are presently available and under development by various companies include Global Positioning System (GPS) capabilities. In addition to GPS, mobile telecommunications service providers may use a network-based geographic location system to determine the position of a mobile unit. Examples of such network-based methods include time difference of arrival (TDOA) systems and angle of arrival (AOA) systems, among others. Mobile Telephones or other mobile telecommunications devices that include GPS capability, or mobile telephones (or other devices) used in a telecommunications system that can use a network-based method to determine its location, are herein referred to as location-enabled mobile units. The advent of location-enabled mobile units provides a new capability around which services may be designed.

Previous known billing systems have included the use of rate zones associated with locations defined by a user. For example, a known system disclosed in U.S. Pat. No. 5,774, 802 (Tell, et al.) teaches using rate zones linked to an individual, such as his or her home or business. In this known system, the user defines predetermined sites that he or she frequents and is charged low rates for usage at these locations, whereas other locations have a premium rate charged. This encourages a user to use a mobile phone even when at home if mobile phone rates in the "at home" zone are comparable to rates charged for land line use, or are covered under an unlimited blanket monthly charge, etc. The infrastructure support for a user at home is no different, however, than the support for that same user walking down the street several blocks from home—it is only the rate being charged that differs. What is considered a "home" zone with low rates for one user is generally considered a "mobile" zone with high rates for other users. This may tend to influence people's behavior to increase cell phone usage in generally predictable ways as an alternative to available land-line telephones, and does not involve any changes to infrastructure other than the addition of a location-sensitive billing capability.

Another known location-based billing system is where a mobile telecommunications company agrees to give free or heavily discounted usage to a certain class of users in exchange for permission to erect a cell base station. For example, employees of a company might be given free cell phone use for all calls handled by a cell base station erected on top of that company's building in exchange for the cell phone company being permitted to erect that same base station. This location-based system, however, does not provide an incentive to users to place or receive mobile telephone calls from any location other than from the area covered by the erected cell base station.

In present mobile telecommunications environments, there is no means known in the art to provide an incentive to place or receive a mobile telephone call or use a mobile telecommunications data service from a dynamically specified geographic location defined by someone other than the user. Thus, an improved system is needed that can provide this capability, determine the location of a MU, and charge the user or owner of the mobile unit a selective fee based on the location at which the MU is located.

BRIEF SUMMARY OF THE INVENTION

In a first aspect of the invention, there is a method for determining the billing rate of mobile telecommunications connections. A location of a mobile telecommunications unit (MU) is determined, and compared to a list of subsidized zone areas. When the MU is located within a subsidized zone, a billing rate that would otherwise be associated with a telecommunications connection is reduced for at least the portion of the call made while the MU is located within the predetermined subsidized zone. The predetermined subsidized zone is not associated with a customer corresponding to the MU.

In a second aspect of the invention, there is a system for determining the billing rate of mobile telecommunications connections. The system includes a processor and memory for storing computer readable instruction that, when executed by the processor, cause the system to perform a set of steps. A location of a mobile telecommunications unit (MU) is determined, and compared to a list of subsidized zone areas. When the MU is located within a subsidized zone, a billing rate that would otherwise be associated with a telecommunications connection is reduced for at least the portion of the call made while the MU is located within the predetermined subsidized zone. The predetermined subsidized zone is not associated with a customer corresponding to the MU.

In a third aspect of the invention, there is a computer readable medium storing computer readable instructions that, when executed by a computing device, cause the device to perform a set of steps. A location of a mobile telecommunications unit (MU) is determined, and compared to a list of subsidized zone areas. When the MU is located within a subsidized zone, a billing rate that would otherwise be associated with a telecommunications connection is reduced for at least the portion of the call made while the MU is located within the predetermined subsidized zone. The predetermined subsidized zone is not associated with a customer corresponding to the MU.

In some embodiments of the invention, the billing rate is reduced by predetermined amount.

In some embodiments, the location of the MU is defined by coordinates of latitude and longitude. In other embodiments, the location is defined by one or more universal transverse mercator (UTM) numbers.

In some embodiments, the subsidy is only provided to those calls which take place at least in part during a predetermined time period.

In some embodiments, the predetermined subsidized zone corresponds to a business' premises.

In some embodiments where there is a plurality of subsidized zones, each zone may be associated with a different subsidy rate.

DETAILED DESCRIPTION OF THE INVENTION

As used herein, and as previously discussed, a mobile unit (MU) is a mobile telecommunications transmitter, transceiver, receiver or the like, capable of supporting a wireless connection, whether used for data or voice communications. Examples include, but are not limited to, cell phones, pagers, wireless web browsers, personal digital assistants, and laptop, handheld, and wearable computers. The operator of the MU is referred to as the user. A stationary unit (SU) is any conventional hard-wired telecommunications device. A telecommunications unit (TU) is either a MU or a SU.

Also as used herein, a connection is a data transfer path from an MU to any destination via a telecommunication system, regardless of whether the data transfer path is used for voice, data service, or any other purpose. This includes, for example, voice phone calls, video phone calls, digital camera picture transfers, general multimedia data transfers, television feeds, movies, e-mail, voice mail, prerecorded messages, data to create synthesized or reconstructed voice messages, map information, geographic coordinate data, World Wide Web content and World Wide Web pointers. Clearly there are many types of data that can be transferred, and the term "connection" is intended to apply to a data transfer path for anything that can be transferred over a telecommunication system.

Also as used herein, a caller refers to the MU that requests creation of a connection, and a callee refers to an MU that is added to a connection responsive to a caller having initiated creation of that connection. A call refers to any instantiation of a connection.

Location-sensitive billing, as described herein, provides a means for mobile telecommunications service providers to encourage increased system usage without reducing the rates they charge for mobile usage. The invention may be used as an incentive for customers to patronize predetermined locations or establishments, or otherwise increase customer patronage of businesses other than the cell phone providers themselves. For example, using the invention, a business such as a coffee shop can build business during off hours in the middle of the afternoon by offering low mobile phone rates to any customer on the premises. This encourages customers to come to the coffee shop to have phone meetings while patronizing the coffee shop rather than while sitting in an office, cubical, or other locale.

Figure 1:
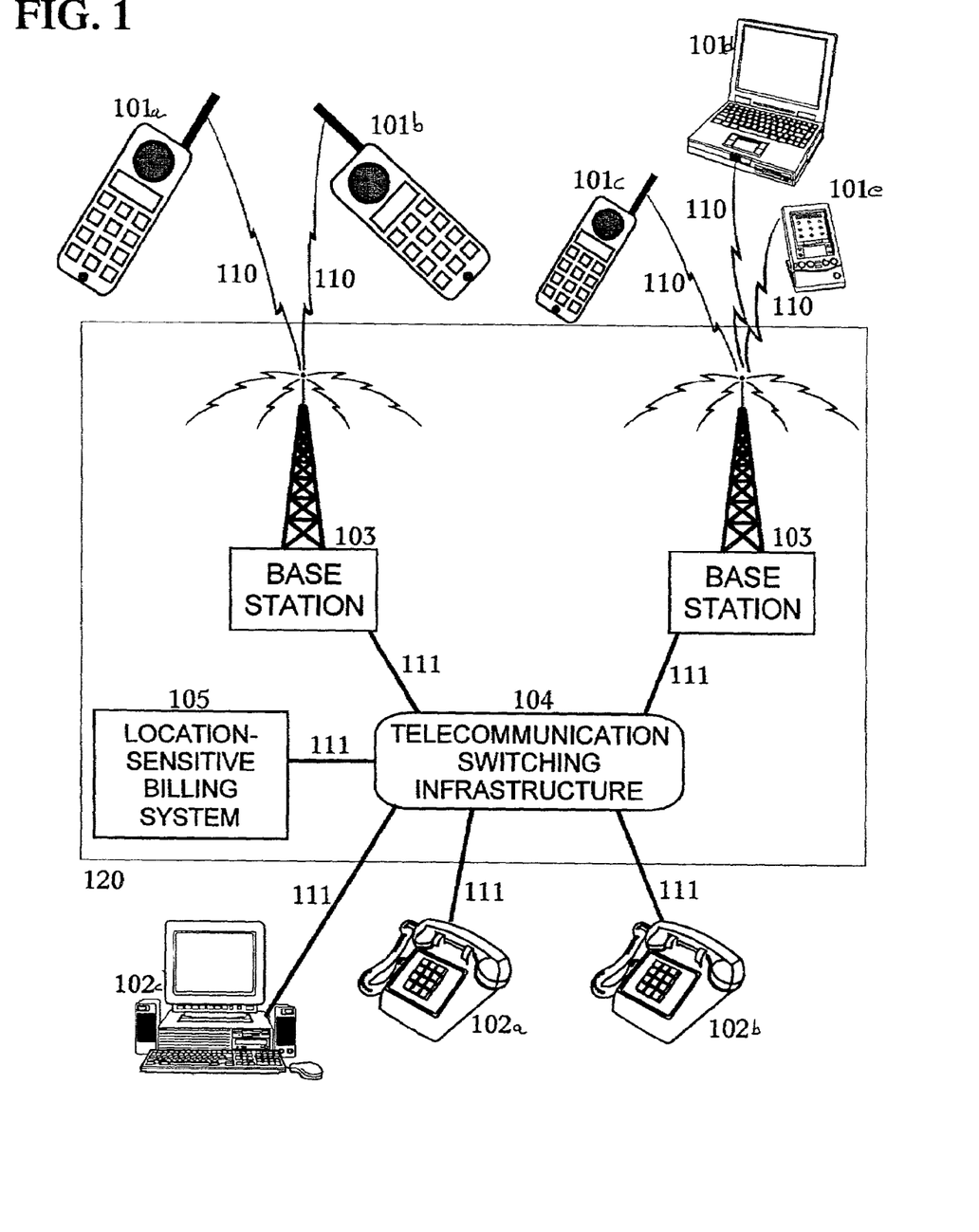
FIG. 1 shows a graphical representation of a telecommunications system adapted for use with the invention.

FIG. 1 shows a typical telecommunications infrastructure with an additional capability of being able to determine the position of MUs 101a-101e using location determination technology, and can provide location-sensitive billing according to the present invention. Telecommunications system 120 contains one or more instances of telecommunication switches 104, general-purpose telecommunication links 111 (fiber, wire, microwave, wireless, etc.), wireless telecommunication links 110, base stations 103 for wireless MUs 101a-101e, and stationary unit (SU) telephones 102a-102c. Additionally, system 120 contains a location-sensitive billing system 105. System 105 may be integrated as part of telecommunications system 120.

Alternatively (not shown), system 105 may be maintained and provided external to system 120, or by a third party provider.

As previously discussed, the telecommunications system may determine the location of MUs in using any of the various technologies. For instance, network based location determination technologies may be included in base stations 103. GPS location determination technology may be included in individual MUs 101.

Using the above-described infrastructure, a first TU may be connected to a second TU, and then one or both TUs may be billed at rates responsive to the location of the TUs participating in the connection. One preferred embodiment of the invention is herein described with reference to FIG. 2. In this embodiment, MU 101a participates in a connection with one or more other units via telecommunication system 120. As part of the connection, a billing cycle is initiated within location-sensitive billing system 105.

Figure 2:
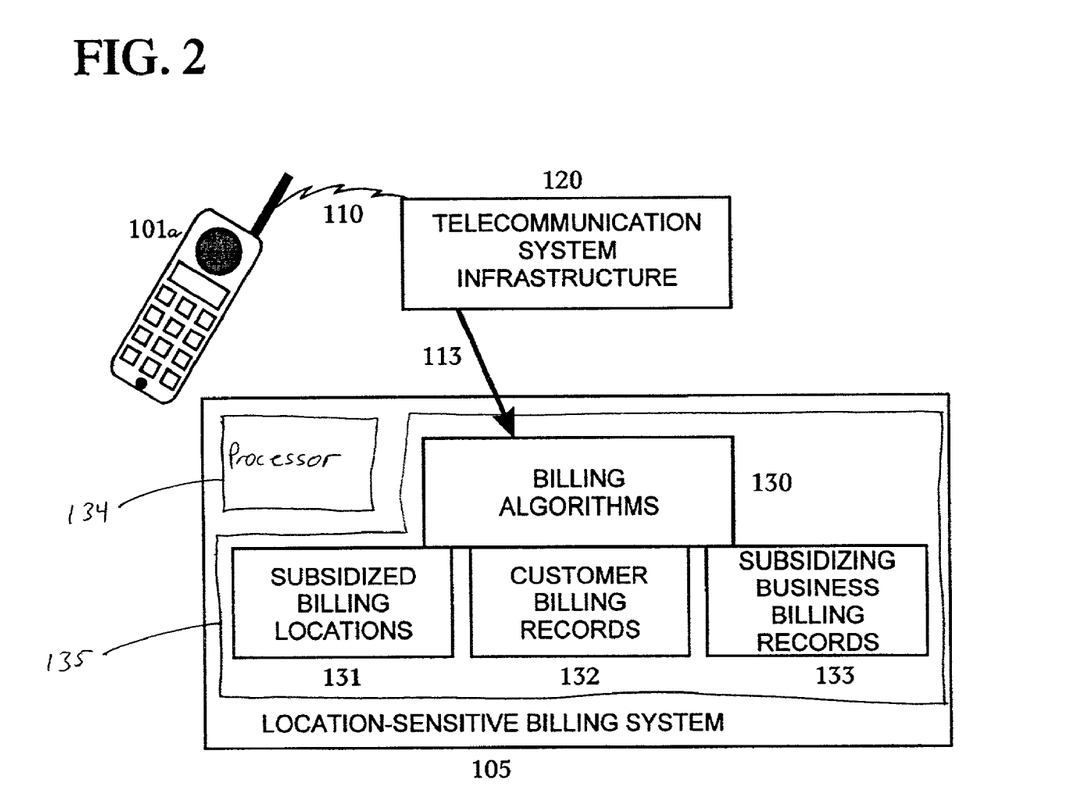
FIG. 2 shows a block diagram of a location-sensitive billing system for use with the telecommunications system shown in FIG. 1.

Location-sensitive billing system 105 may be a conventional computer, network server, mainframe, or any other computing device adopted to perform the invention as described herein. System 105 includes a processor 134 and memory 135. The memory may contain the following four logical components. Billing software 130 causes the billing system to perform the steps shown in FIG. 3 on computer hardware or other means as may be apparent to one skilled in the art. A database of subsidized billing locations 131 contains information about each billing location eligible for a subsidy, preferably with each list entry containing geographic location coordinates, billing rate information, and a pointer to business information to be used in updating business billing records 133.

Figure 4:
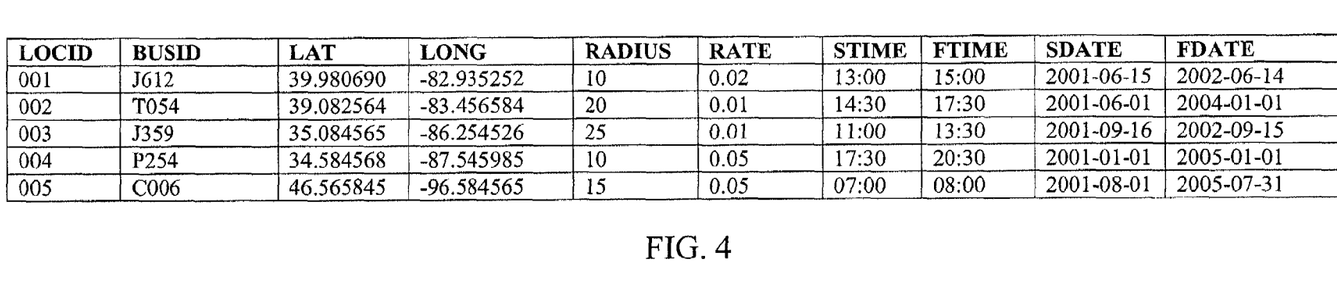
FIG. 4 shows sample data in a subsidy database.

Geographic location coordinates may be a latitude and longitude, with an associated radius r, such that all mobile units within the distance r of the geographic location will receive the subsidized rate. Geographic location coordinates may also be one or more universal transverse mercator (UTM) numbers with similarly associated radius r. Billing location database 131 may also contain time of day or date information such that subsidies may vary responsive to time of day, day of the week, holidays, etc. Sample subsidy information contained in database 131 is shown in FIG. 4. Customer billing records 132 contain traditional customer billing information, such as account holder name, address, account number, etc., used in generating customer telephone bills. Subsidizing business billing records 133 contains billing records of subsidies and calling activity associated with each location in billing locations list 131. This information is used, for example, to generate a bill for each subsidizing business reporting customer cell phone usage and subsidy information. Sample subsidizing business billing records are shown in FIG. 5.

FIG. 4 shows a set of records that may be found in the billing location database 131. Each column in the top row in the table represents the name of a field of data that may be included within the database. Each subsequent row represents a database record representing a subsidized billing location. Each record in the database may have a unique record identifier for the table (LOCID), a cross-referencing field to a business records table (BUSID), latitudinal location (LAT), longitudinal location (LONG), distance from the location within which mobile telecommunications units will receive subsidized rates (RADIUS), rate per minute that the associated business or user will receive or pay (RATE), time-of-day that subsidized rates begin or start (STIME), time-of-day that subsidized rates end or finish (FTIME), date that subsidized rates take effect or start (SDATE), date that subsidized rates are discontinued or finish (FDATE). As would be obvious to one skilled in the art, other values may be included. Likewise, some of the included values, such as at least STIME, FTIME, SDATE, and FDATE, may be optional.

Figure 5:
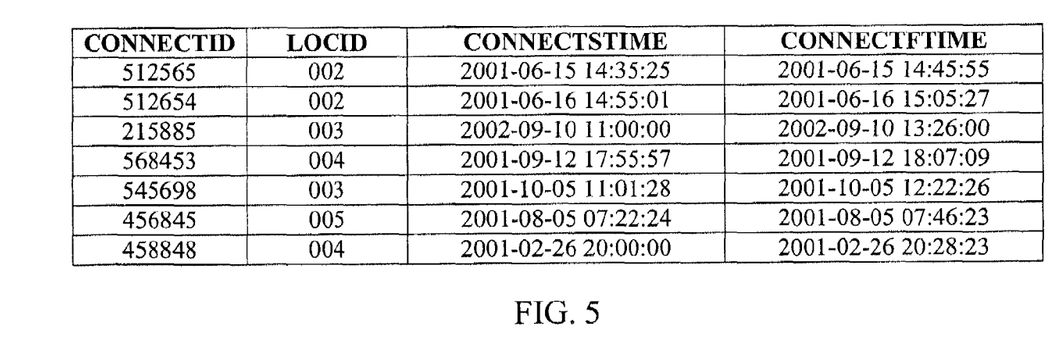
FIG. 5 shows sample subsidizing business billing records.

FIG. 5 shows a set of records that may be used in the subsidizing business billing records database 133. Each column in the top row in the table represents the name of a field of data within the database. Each subsequent row represents a database record corresponding to a mobile telecommunications connection made at a subsidized billing location. Each record or row in the database may contain the following information: a unique record identifier for the table (CONNECTID), the location at which the mobile telecommunications connection was made (LOCID), the time the connection began (CONNECTSTIME), and the time the connection finished (CONNECTFTIME). As would be obvious to one skilled in the art, other values may be included. Likewise, some of the included values, such as CONNECTSTIME or CONNECTFTIME may be optional, and instead a value for the duration of the call may be used, or a duration of the call that occurred while the mobile unit was within the subsidized billing area.

With reference back to FIG. 3, a billing cycle may be initiated by receiving, in step 301, a request to record phone call billing information via link 113. With the request is location information corresponding to the geographic location of the TU while the call is or was in progress. Billing events may be received every minute of a call and accumulated, or may be done at the end of each call, or in any other reasonable manner that would be apparent to one skilled in the art. In a preferred embodiment each participant in a connection is billed separately for simplicity, although equivalent approaches apply to billing done to groups of users party to the same connection.

Figure 3:
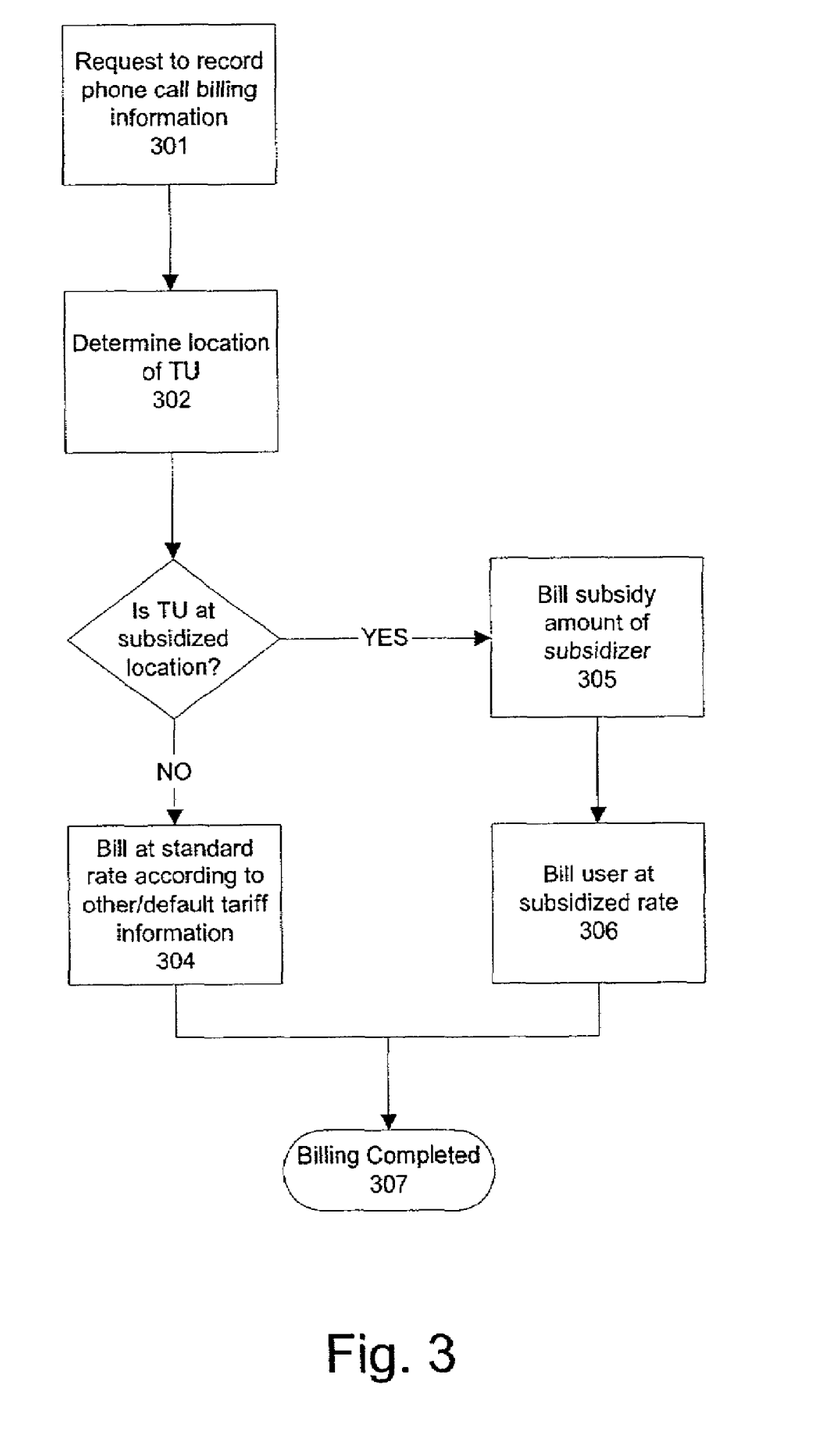
FIG. 3 shows a flowchart of steps performed by the location-sensitive billing system.

In step 302, the system determines the location of the user being billed, and queries billing location database 131 for a matching subsidized location. In the event of multiple matches a conflict resolution procedure is followed, preferably by picking the match giving the most favorable rate to the customer. Alternatively, the system may pick the match that gives the most favorable profit to the telecommunications company, or use any predetermined algorithm. In step 303, the system determines whether the call is subsidized in response to the query. If the call is not subsidized, step 304 conducts billing according to any other tariffs that may be in effect per standard billing practices.

If a location subsidy is in effect, step 305 bills the amount of the subsidy for that call to the subsidizer, recording appropriate information in business billing records 133. The monetary subsidy amount might be positive, negative, or zero depending on the particular subsidy negotiated. A positive subsidy occurs when the subsidizing business pays a predetermined amount, such as $0.03 per minute, for each call within its subsidized area. A corresponding amount is reduced from the user's bill for each call. A negative subsidy occurs when the subsidizing business receives a predetermined subsidy from the telecommunications service provider for each call within its subsidized area, and a lower or no subsidy is given to the user. This may occur when the subsidy area is located in a low telecommunications traffic area, and the subsidy is being used as an incentive to attract customers to a location, or as an incentive to a business to allow a telecommunications service provider to erect a base station in that location. A zero subsidy occurs when both a positive and a negative subsidy are present, and they are equal. Alternatively, the positive and negative subsidies may be applied independently, such that the subsidizing business can see them individually, yet still end up with a zero-sum balance.

In step 306, the system records billing information reflecting any subsidies for the phone user in customer billing records database 132.

In step 307, billing is completed whether the call was subsidized or not. Once billing information is recorded, standard procedures are used to generate bills, collect revenues, and the like as commonly practiced in the telecommunication industry.

In some embodiments, the MU being billed must remain in the subsidized area for the duration of the call in order to receive the subsidized billing rate. In other embodiments, the call is only subsidized for the duration that the MU is located in the subsidized billing area.

In some embodiments, the subsidizing business may be the telecommunications service provider, regardless of the physical location of the subsidized area. This is because the subsidized area may provide the service provider with a statistically regular supply of mobile phone users who would otherwise be using land lines. That is, the telecommunications service provider can create subsidized areas to induce customers to use their MUs from those locations, thus increasing traffic at that location and reducing traffic at other locations.

Figure 6:
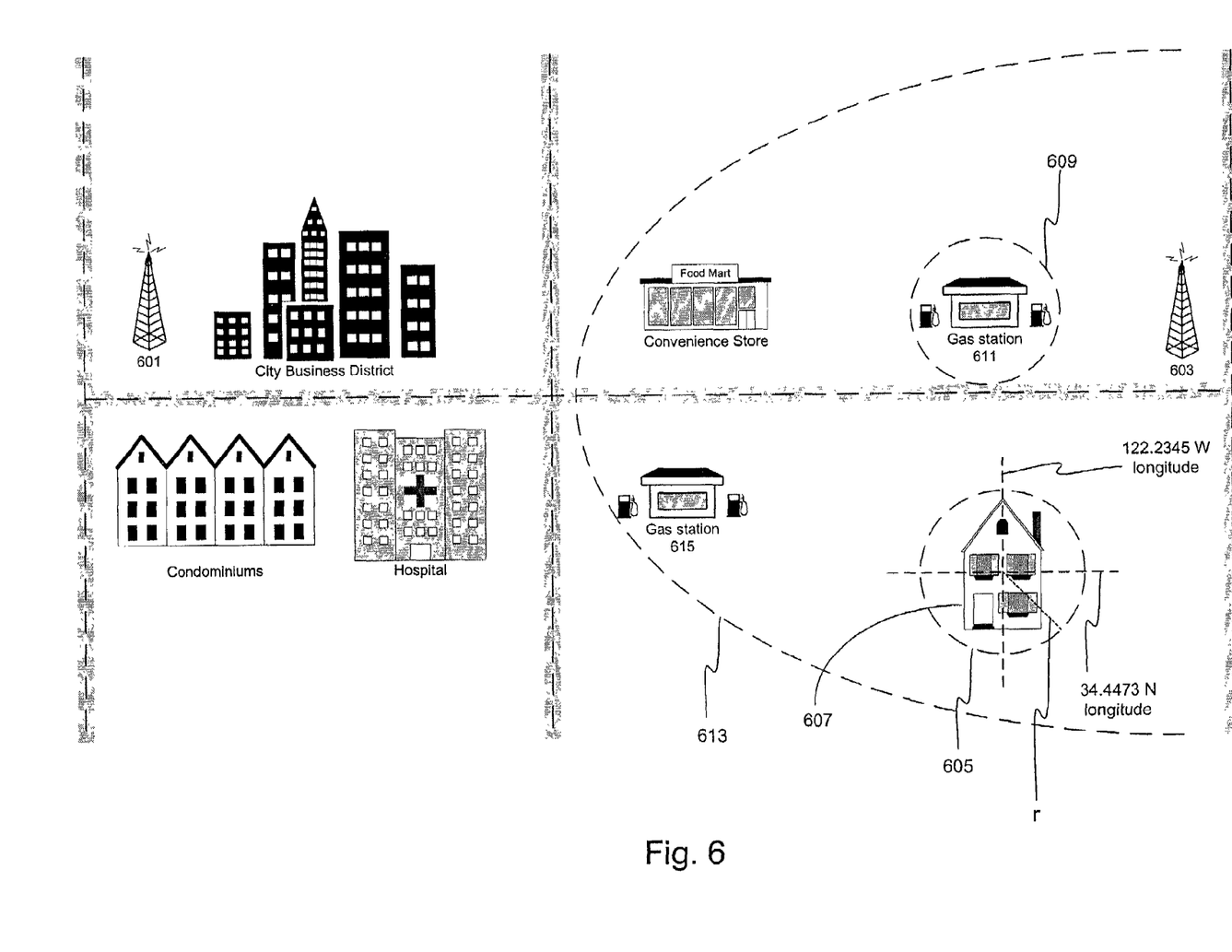
FIG. 6 is a pictorial representation of a subsidized billing area.

An example is illustrative of the present invention. FIG. 6 shows a map of a portion of a city. The city may contain mobile communications towers or base stations 601, 603. In this example, the mobile communications tower or base station 601 may receive heavy telecommunications traffic because it is in a commercial area in the city. Alternatively, a base station 603, being in a less congested area of town, may experience less traffic. In order to induce customers to the coverage area of the lesser-used base station 603, a telecommunications provider may offer reverse subsidies to businesses in that area, such as coffee shop 607 and gas station 611. That is, the telecommunications provider may pay businesses per minute of telecommunications traffic to or from their premises, because they are located within a service area 613 experiencing low traffic volume. For instance, the provider may offer coffee shop 607 a reverse subsidy of $0.01 per minute for customers attracted by the coffee shop to the area 613 covered by base station 603.

In addition, the coffee shop 607, in conjunction with the service provider, may offer customers a subsidy of $0.03 per minute for customers using their MUs on the coffee shop premises, in order to attract business to the coffee shop. This results in a net cost of $0.02/minute to the coffee shop, which it may recoup in the form of the additional retail sales. The coffee shop's subsidized area 605 may be defined by coordinates of latitude and longitude and a radius r, such that the resulting circle covers approximately the same area as the coffee shop.

Similarly, gas station bill may receive the same negative subsidy ($0.01) from the telecommunications provider, because the gas station is also within the coverage area 613 of base station 603. The gas station may also offer customers a subsidy of $0.02 per minute for the portion of calls made on their premises, as approximately covered by area 609, defined similar to area 605. This may encourage customers to buy gas from gas station 611 rather than from gas station 615.

It should be appreciated by those skilled in the art that subsidized billing areas may be defined in other ways to accomplish the same result. For instance, a subsidized coverage area may be defined by three or more sets of latitude/longitude coordinates, forming a polygon-shaped coverage area.

Using each patron's MU has an advantage over installing landlines at the coffee shop to attract customers in that patrons can receive calls at their usual mobile phone number. Because customers provide their own mobile telecommunications equipment, and because the base stations in the cell generally will already exist, the coffee shop's investment in phone equipment is typically zero, or minimal.

There are a number of alternatives to the above embodiment that may constitute desirable embodiments in a variety of alternate situations. This list of alternative embodiments should be considered merely illustrative, and is not intended to limit the scope of the invention.

Any or all locations that provide subsidies may install telecommunication infrastructure on their premises to offload traffic generated by their customers from the publicly accessible telecommunication infrastructure. In this case their subsidy might well be a revenue inflow as they are in effect becoming their own very small mobile communications company that hands off connections to other telephone companies.

Subsidized billing can also be combined with affinity memberships for various businesses, and become one of the benefits offered for affinity club membership. For example, a coffee shop may sell "preferred customer" cards that carry the benefit of reduced cell phone rates as well as, perhaps, a free cup of coffee after a predefined number of purchases.

The subsidy arrangement taught herein may be combined with existing customer specific billing schemes that associate billing zones with a customer instead of with subsidizing businesses. In such a combined system the customer-based zone information would preferably be invoked as part of the standard tariff step of 304. That is, when the subsidized location information is combined with existing customer subsidies (e.g., an existing subsidy or discount based on who the customer is), then the existing customer subsidy might not be considered a subsidized location after step 302. Instead, this existing customer subsidy is included in the default tariff information in step 304.

Among the many benefits of this invention is a paradigm shift from previous location-sensitive billing practices of associating billing zones with users to instead associate billing zones with locations themselves in response to the existence of businesses or other entities at those locations who desire to encourage visits to those areas. One benefit of this shift in zone association is that businesses or other locations can share in creating and profiting from the revenue stream generated by mobile telecommunication users, as well as use the lure of reduced-rate access to attract customers. Mobile telecommunications providers can similarly benefit from this approach to zone association by further increasing usage at times and locations where there is low capacity that would otherwise go unused, and possibly decreasing traffic from overloaded base stations.

While descriptions of preferred embodiments have generally assumed that a "user" is a person possessing a single TU, it is of course possible for one person to possess multiple TUs, and for TUs to be associated with non-persons such as computers running automated software, vehicles, companies and so on. Therefore, the term "user" is meant to be illustrative and not limiting. The terms "telecommunication infrastructure" and "telecommunication system" and similar terms are used as broadly as possible within the known art. In particular, such approaches to delivering telecommunication data include not only phones and phone-based systems such as DSL (digital subscriber line), but also cable TV systems, and any and all data networks, even if established only within specific buildings or other areas.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for adjusting a billing rate of a mobile telecommunications connection associated with a mobile telecommunications unit (MU), comprising the steps of:
   determining whether a location of the MU is inside or outside a predetermined subsidized zone associated with a commercial establishment;
   responsive solely to a determination that the location of the MU is inside the subsidized zone, adjusting the billing rate for the telecommunications connection to a first predetermined billing rate; and
   responsive solely to a determination that the MU is outside the predetermined subsidized zone, adjusting the billing rate for the telecommunications connection to a second predetermined billing rate.

2. The method of claim 1, wherein the first predetermined billing rate is less than the second predetermined billing rate.

3. The method of claim 1, wherein the location is defined by latitude and longitude.

4. The method of claim 1, wherein the location is determined by a Global Positioning System (GPS).

5. The method of claim 1, wherein the location is defined by Universal Transverse Mercator (UTM) numbers.

6. The method of claim 1, wherein information corresponding to the predetermined subsidized zone is stored in a database.

7. The method of claim 6, wherein the predetermined subsidized zone information comprises a time period, and wherein the billing rate is reduced when the telecommunications connection occurred at least in part during the time period.

8. The method of claim 1, wherein the predetermined subsidized zone is defined by a geographical point and a radius.

9. The method of claim 1, wherein the commercial establishment pays the first predetermined billing rate.

10. The method of claim 1, wherein the predetermined subsidized zone is one of a plurality of predetermined subsidized zones, each associated with a proximity to a different commercial establishment.

11. The method of claim 10, wherein the billing rate is reduced by a first amount when the location of the MU is within a first predetermined subsidized zone, and the billing rate is reduced by a second amount when the location of the MU is within a second predetermined subsidized zone.

12. A system for adjusting a billing rate of a mobile telecommunications connection associated with a mobile telecommunications unit (MU), comprising:
   a processor;
   memory for storing computer readable instructions that, when executed by the processor, cause the system to perform the operations of:
      determining whether a location of the MU is inside or outside a predetermined subsidized zone associated with a commercial establishment;
      responsive solely to a determination that the location of the MU is inside the predetermined subsidized zone, adjusting the billing rate for the telecommunications connection to a first predetermined billing rate; and
      responsive to a determination that the MU is outside the predetermined subsidized zone, adjusting the billing rate for the telecommunications connection to a second predetermined billing rate.

13. The system of claim 12, wherein the first predetermined billing rate is less than the second predetermined billing rate.

14. The system of claim 12, wherein the location is defined by latitude and longitude.

15. The system of claim 12, wherein the location is determined by a Global Positioning System (GPS).

16. The system of claim 12, wherein the location is defined by Universal Transverse Mercator (UTM) numbers.

17. The system of claim 12, wherein information corresponding to the predetermined subsidized zone is stored in a database.

18. The system of claim 17, wherein the predetermined subsidized zone information comprises a time period, and wherein the billing rate is reduced when the telecommunications connection occurred at least in part during the time period.

19. The system of claim 12, wherein the predetermined subsidized zone is defined by a geographical point and a radius.

20. The system of claim 12, wherein the commercial establishment pays the first predetermined billing rate.

21. The system of claim 12, wherein the predetermined subsidized zone is one of a plurality of predetermined subsidized zones, each associated with a proximity to a different commercial establishment.

22. The system of claim 21, wherein the billing rate is reduced by a first amount when the location of the MU is within a first predetermined subsidized zone, and the billing rate is reduced by a second amount when the location of the MU is within a second predetermined subsidized zone.

23. A computer program product for adjusting a billing rate of a mobile telecommunications connection associated with a mobile telecommunications unit (MU) comprising a computer-readable medium containing computer program code for performing the operations of:
   determining whether a location of the MU is inside or outside a predetermined subsidized zone associated with a commercial establishment;
   responsive solely to a determination that the location of the MU is inside the predetermined subsidized zone, adjusting the billing rate for the telecommunications connection to a first predetermined billing rate; and
   responsive solely to a determination that the MU is outside the predetermined subsidized zone, adjusting the billing rate for the telecommunications connection to a second predetermined billing rate.

24. The computer program product of claim 23, wherein the first predetermined billing rate is less than the second predetermined billing rate.

25. The computer program product of claim 23, wherein the location is defined by latitude and longitude.

26. The computer program product of claim 23, wherein the location is determined by a Global Positioning System (GPS).

27. The computer program product of claim 23, wherein the location is defined by Universal Transverse Mercator (UTM) numbers.

28. The computer program product of claim 23, wherein information corresponding to the predetermined subsidized zone is stored in a database.

29. The computer program product of claim 28, wherein the predetermined subsidized zone information comprises a time period, wherein the billing rate is reduced when the telecommunications connection occurred at least in part during the time period.

30. The computer program product of claim 23, wherein the predetermined subsidized zone is defined by a geographical point and a radius.

31. The system of claim 23, wherein the commercial establishment pays the first predetermined billing rate.

32. The computer program product of claim 23, wherein the predetermined subsidized zone is one of a plurality of predetermined subsidized zones, each associated with a proximity to a different commercial establishment.

33. The computer program product of claim 32, wherein the billing rate is reduced by a first amount when the location of the MU is within a first predetermined subsidized zone, and the billing rate is reduced by a second amount when the location of the MU is within a second predetermined subsidized zone.

* * * * *

UNITED STATES PATENT AND TRADEMARK OFFICE
CERTIFICATE OF CORRECTION

PATENT NO. : 7,668,765 B2 Page 1 of 1
APPLICATION NO. : 09/898497
DATED : February 23, 2010
INVENTOR(S) : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Seventh Day of December, 2010

David J. Kappos
*Director of the United States Patent and Trademark Office*